United States Patent
Faruque et al.

(10) Patent No.: US 12,522,296 B2
(45) Date of Patent: Jan. 13, 2026

(54) ACTUATABLE WHEEL DEFLECTOR

(71) Applicant: Ford Global Technologies, LLC, Dearborn, MI (US)

(72) Inventors: Mohammad Omar Faruque, Ann Arbor, MI (US); S.M. Iskander Farooq, Novi, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 317 days.

(21) Appl. No.: 18/336,256

(22) Filed: Jun. 16, 2023

(65) Prior Publication Data

US 2024/0416997 A1    Dec. 19, 2024

(51) Int. Cl.
*B62D 21/15*    (2006.01)
*B62D 25/02*    (2006.01)
*B62D 25/16*    (2006.01)

(52) U.S. Cl.
CPC ......... *B62D 21/152* (2013.01); *B62D 21/155* (2013.01); *B62D 25/025* (2013.01); *B62D 25/16* (2013.01)

(58) Field of Classification Search
CPC .............................. B62D 25/025; B62D 25/16
USPC ................................ 296/187.09, 1, 198, 209
See application file for complete search history.

(56) References Cited

U.S. PATENT DOCUMENTS

| | | | |
|---|---|---|---|
| 7,926,847 B2 * | 4/2011 | Auer ..................... | B62D 21/152 |
| | | | 293/114 |
| 9,067,469 B2 * | 6/2015 | Asjad ................... | B62D 21/155 |
| 9,067,617 B2 * | 6/2015 | Konchan ................ | B62D 9/00 |
| 9,205,803 B2 | 12/2015 | Farooq et al. | |
| 9,527,466 B2 * | 12/2016 | Kalandek .............. | B60R 21/00 |
| 9,598,032 B1 * | 3/2017 | Misikir ................. | B60R 21/00 |
| 9,669,784 B2 * | 6/2017 | Jensen ................ | B62D 21/152 |
| 10,315,700 B2 * | 6/2019 | Coppuck ................ | B60G 3/20 |
| 2015/0000995 A1 * | 1/2015 | Konchan ................ | B62D 9/00 |
| | | | 180/280 |
| 2015/0084322 A1 * | 3/2015 | Killian .................. | B60R 19/00 |
| | | | 301/95.101 |
| 2019/0077349 A1 * | 3/2019 | Saito .................... | B62D 25/025 |

FOREIGN PATENT DOCUMENTS

| | | | | |
|---|---|---|---|---|
| DE | 102013204567 B4 * | 3/2022 | .......... | B62D 21/152 |
| JP | 2005255010 A | 9/2005 | | |
| JP | 2009214654 A | 9/2009 | | |

OTHER PUBLICATIONS

DE102013204567 Text (Year: 2022).*

* cited by examiner

*Primary Examiner* — Dennis H Pedder
(74) *Attorney, Agent, or Firm* — Frank A. MacKenzie; Brooks Kushman P.C.

(57) ABSTRACT

A vehicle includes a vehicle body having a wheel well. The vehicle includes a linear actuator supported by the vehicle body vehicle-rearward of the wheel well. The vehicle includes a first member extending between a first end and a second end, the first end pivotally connected to the vehicle body. The vehicle includes a second member extending between a first end and a second end, the first end of the second member pivotally connected to the second end of the first member, the second end of the second member connected to the linear actuator. The linear actuator, the first member, and the second member movable from a stowed position toward the wheel well to a deployed position.

17 Claims, 5 Drawing Sheets

ACTUATABLE WHEEL DEFLECTOR

BACKGROUND

During certain vehicle impacts, e.g., certain offset frontal impacts of a vehicle, the direction the impact is offset from major structural components of the vehicle. Certain offset front impacts can be simulated with standardized tests like small offset rigid barrier (SORB) frontal crash test. For example, the Insurance Institute for Highway Safety (IIHS) sets a standard for a SORB frontal crash test in which the vehicle impacts a rigid barrier at 40 miles/hour with 25% of an outer portion of the vehicle overlapping the rigid barrier.

DETAILED DESCRIPTION

A vehicle includes a vehicle body having a wheel well. The vehicle includes a linear actuator supported by the vehicle body vehicle-rearward of the wheel well. The vehicle includes a first member extending between a first end and a second end, the first end pivotally connected to the vehicle body. The vehicle includes a second member extending between a first end and a second end, the first end of the second member pivotally connected to the second end of the first member, the second end of the second member connected to the linear actuator. The linear actuator, the first member, and the second member are movable from a stowed position toward the wheel well to a deployed position.

The vehicle body may include a rocker, and wherein the linear actuator is fixed to the rocker.

The first end of the second member may be vehicle-forward and vehicle-inboard of the second end of the second member at the deployed position.

The vehicle may include a wheel supported in the wheel well, and the first end of the second member at the stowed position may be vehicle-rearward of the wheel and the first end of the second member at the deployed position may be aligned with the wheel along a vehicle-longitudinal axis.

The vehicle may include a wheel supported in the wheel well, and the second member at the stowed position may be spaced from the wheel and the second member at the deployed position abuts the wheel.

The second end of the first member at the stowed position is vehicle-rearward of the first end of the first member at the stowed position, and the second end of the first member at the deployed position is vehicle-forward of the first end of the first member at the deployed position.

The vehicle may include a bulkhead movable with the linear actuator from stowed position to the deployed position, the second end of the second member pivotally connected to the bulkhead.

The vehicle may include a lock supported by the vehicle body, the lock configured to maintain the bulkhead at the deployed position.

The bulkhead at the stowed position may be vehicle-rearward of the bulkhead at the deployed position.

The vehicle may include a wheel supported in the wheel well, and the bulkhead at the deployed position may be spaced from the wheel.

The linear actuator may include pyrotechnic material.

The vehicle body may include a floor, and the linear actuator and the second member may be below the floor.

The first member may be elongated between the first end of the first member and the second end of the first member.

The second member may be elongated between the first end of the second member and the second end of the second member.

The linear actuator may include a first telescoping member and a second telescoping member lineally slidable within the first telescoping member.

The linear actuator may include a pyrotechnic material disposed within the first telescoping member.

The linear actuator at the stowed position may define a first length and the linear actuator at the deployed position may define a second length that is longer than the first length.

With reference to the Figures, wherein like numerals indicate like parts throughout the several views, a vehicle 20 is shown. The vehicle 20 has a vehicle body 22 defining a wheel well 24. The vehicle 20 includes a linear actuator 26 supported by the vehicle body 22 vehicle-rearward of the wheel well 24. The vehicle 20 includes a first member 28 extending between a first end 30 and a second end 32, the first end 30 pivotally connected to the vehicle body 22. The vehicle 20 includes a second member 34 extending between a first end 36 and a second end 38, the first end 36 of the second member 34 pivotally connected to the second end 32 of the first member 28, the second end 38 of the second member 34 connected to the linear actuator 26. The linear actuator 26, the first member 28, and the second member 34 are movable from a stowed position toward the wheel well 24 to a deployed position. Movement of the linear actuator 26, the first member 28, and the second member 34 may control kinematics of a wheel 40 supported in the wheel well 24 during certain vehicle impacts.

Figure 1:
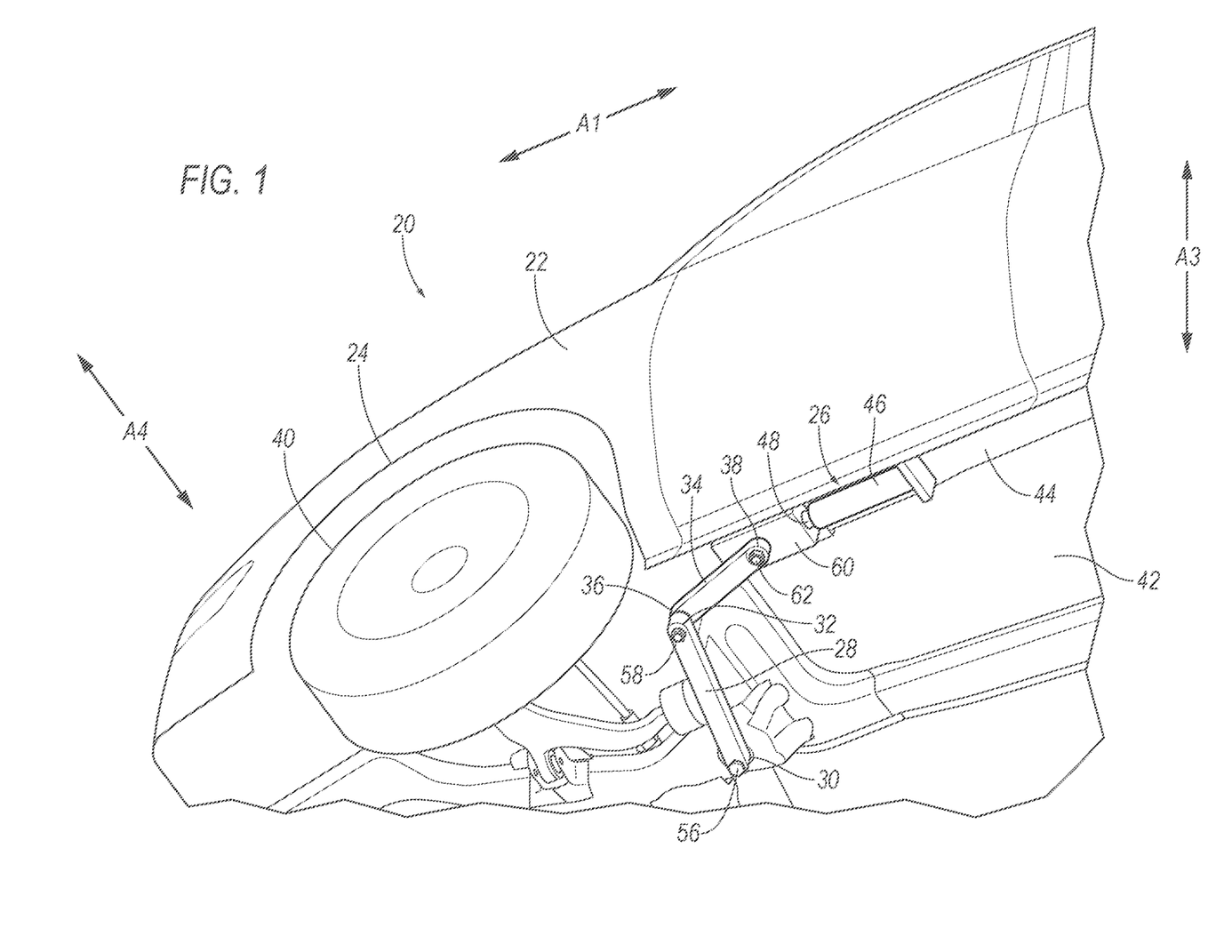
FIG. 1 is a bottom perspective view of a portion of a vehicle with an assembly for deflecting a wheel, the assembly in a stowed position.
Figure 2:
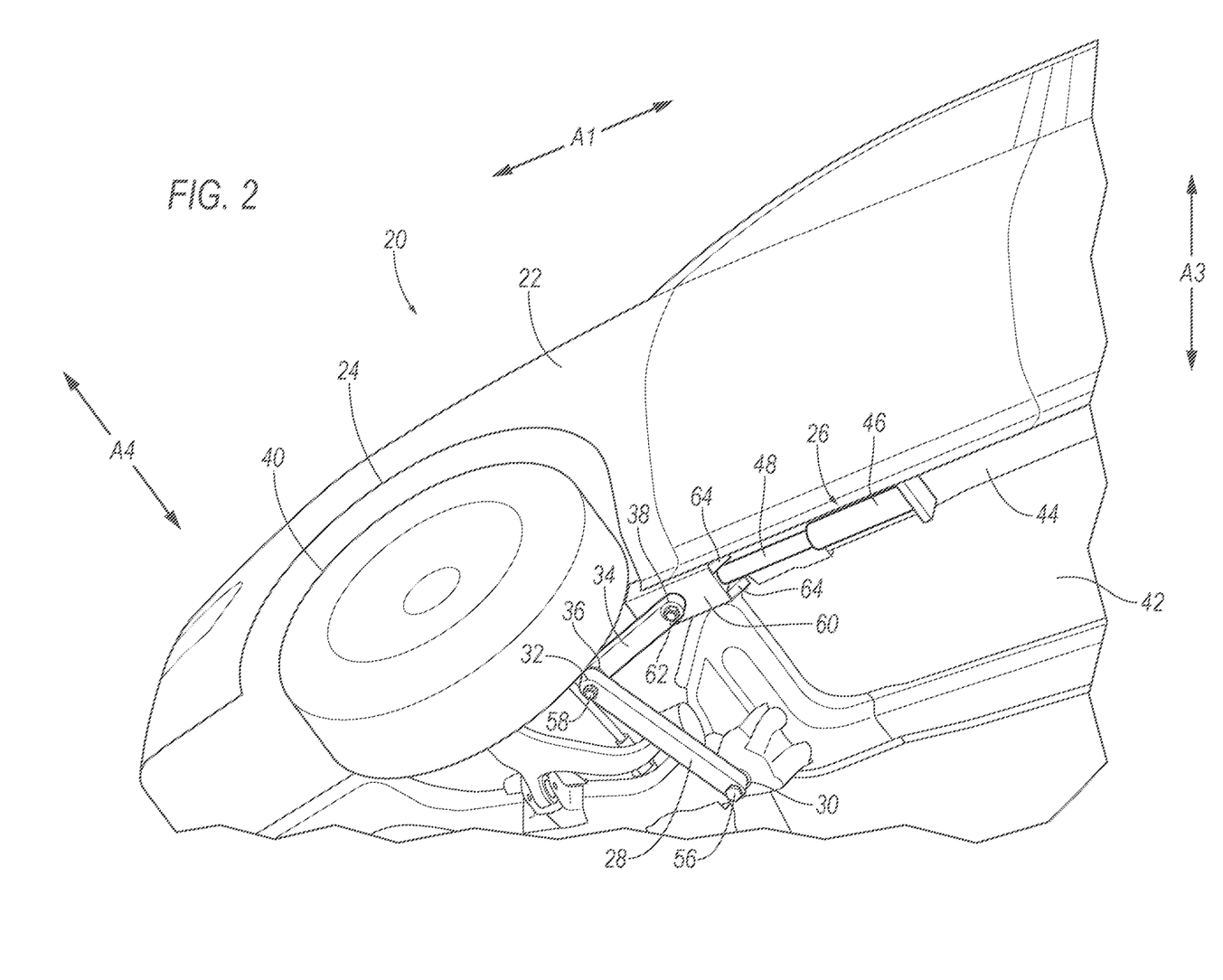
FIG. 2 is a bottom perspective view of the portion of the vehicle with the assembly in a deployed position.
Figure 3:
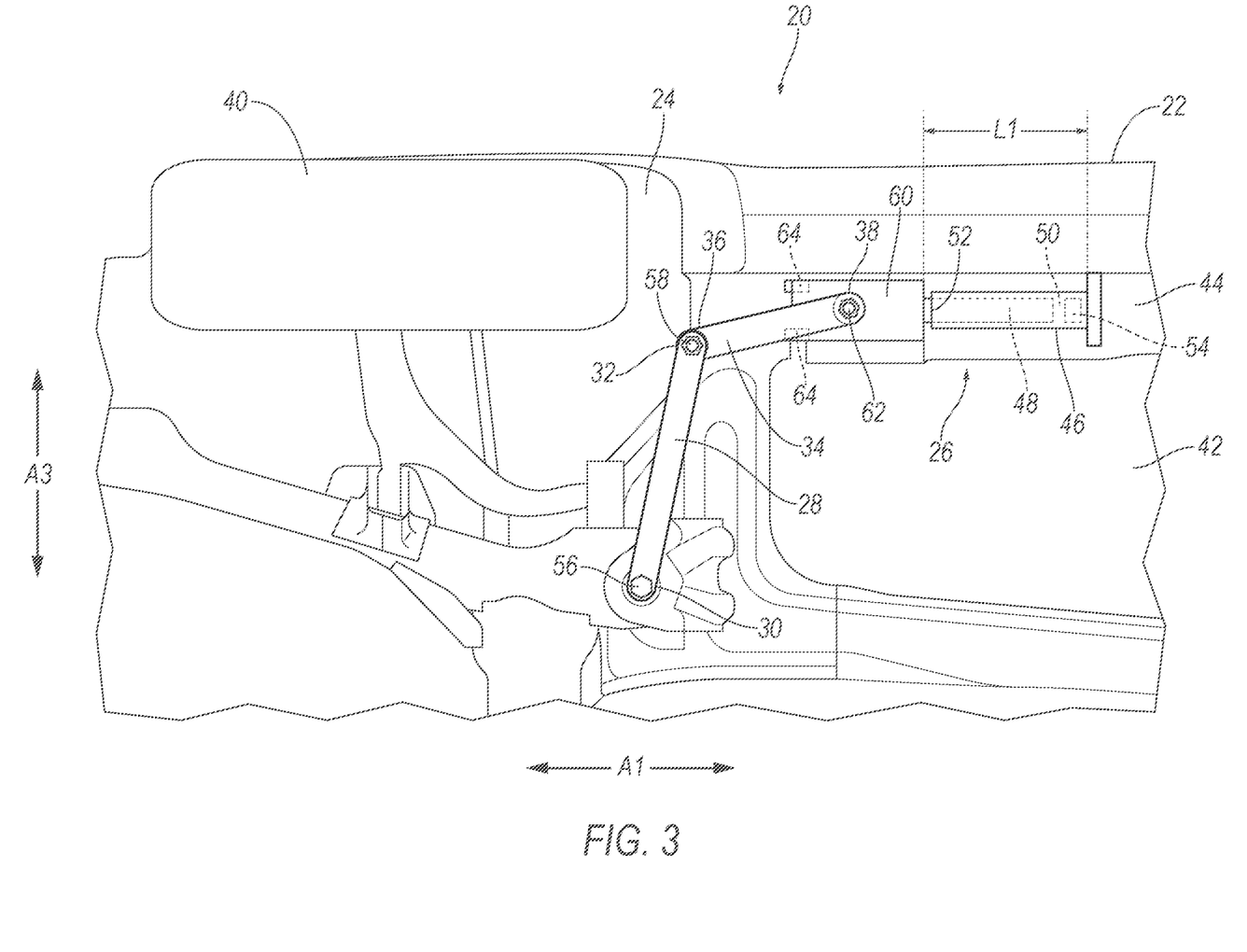
FIG. 3 is a bottom view of the portion of the vehicle with the assembly in the stowed position.
Figure 4:
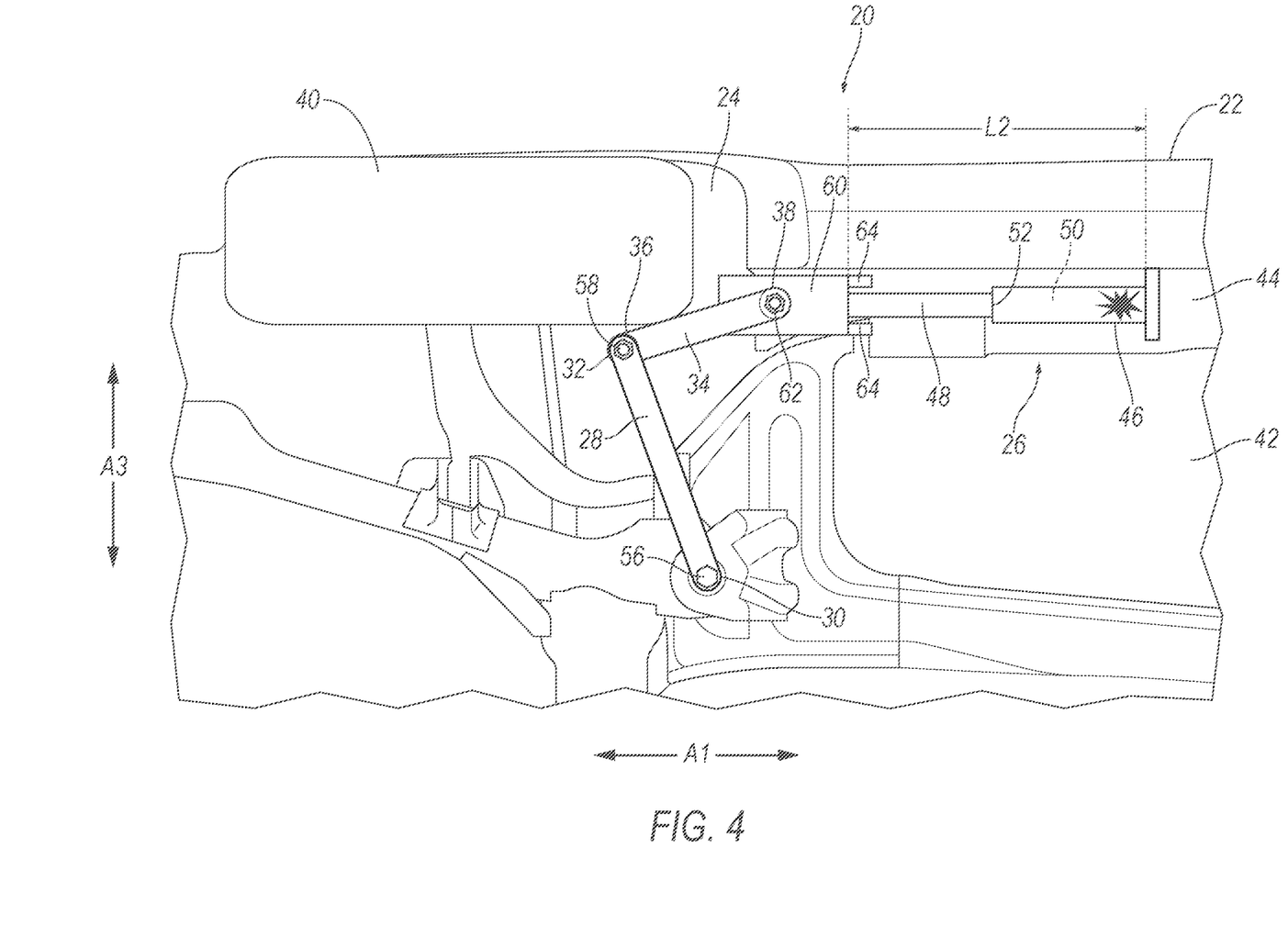
FIG. 4 is a bottom view of the portion of the vehicle with the assembly in the deployed position.

During certain impacts of the vehicle 20, e.g., a small-offset rigid-barrier (SORB) frontal crash test, the linear actuator 26 may be actuated to move from the stowed position (shown in FIGS. 1 and 3) to the deployed position (shown in FIGS. 2 and 4). Movement of the linear actuator 26 to the deployed position moves the first member 28 and the second member 34 to the deployed position. In the deployed position, the second member 34 is positioned to apply a vehicle-outboard force to the wheel 40 during certain vehicle impacts. For example, in the event that force of the rigid barrier of a SORB frontal crash test drives the wheel 40 in a vehicle-rearward direction and/or vehicle inboard direction, the second member 34 in the deployed position deflects the wheel 40 vehicle-outboard.

The vehicle 20 may be any suitable type of ground vehicle, e.g., a passenger or commercial automobile such as a sedan, a coupe, a truck, a sport utility, a crossover, a van, a minivan, a taxi, a bus, etc.

In the present document, relative vehicular orientations and directions by way of example, top, bottom, front, rear, forward, rearward, outboard, inboard, inward, outward, lateral, left, right, etc., are from the perspective of an occupant seated in the vehicle 20 facing forward, e.g., toward a forward instrument panel and/or forward windshield of the vehicle 20. The forward direction of the vehicle 20 is the direction of movement of the vehicle 20 when the vehicle 20 is engaged in forward drive with wheels of the vehicle 20 straight. Orientations and directions relative to the assembly are given related to when the assembly is supported by the vehicle 20 as described below and shown in the Figures.

The vehicle 20 defines a longitudinal axis A1 which extends between a front and a rear of the vehicle 20. The vehicle 20 defines a vertical axis A2 which extends between a top and a bottom of the vehicle 20. The vehicle 20 defines a lateral axis A3 which extends between a right side and a left side of the vehicle 20. The longitudinal axis A1, the vertical axis A2, and the lateral axis A3 are perpendicular relative to each other.

The vehicle body 22 defines a passenger compartment to house occupants, if any, of the vehicle 20. The passenger compartment may extend across the vehicle 20, i.e., from the right side to the left side of the vehicle 20. The passenger compartment includes a front end and a rear end with the front end being in front of the rear end during forward movement of the vehicle 20. The vehicle body 22 includes, e.g., a roof, one or more pillars, a floor 42, rockers 44, the wheel wells 24, etc. The roof and the floor 42 may extend along the longitudinal axis A1 and the lateral axis A3. The roof is above and spaced from the floor 42 along the vertical axis A2. The pillars may extend from the roof to the floor 42. The floor 42 of the vehicle 20 supports objects, such as seats, occupants, etc., within the passenger compartment. The floor 42 may extend from the front end to the rear end of the passenger compartment and from the right side to the left side of the vehicle 20. The wheel well 24 defines an envelope that receives the wheel 40 of the vehicle 20. The wheel well 24 may be defined by body panels, cladding, etc. The rockers 44 provide rigidity at the right side and the left side of the vehicle 20 and support other vehicle 20 components, such as doors in closed positions. The rockers 44 may be the lowest portion of the sides of the vehicle 20. The rockers 44 are elongated along the longitudinal axis A1. The rockers 44 are spaced from each other along the lateral axis A3. One rocker 44 may extend between the wheel wells 24 of each side of the vehicle 20, e.g., along the longitudinal axis A1.

The vehicle body 22 may be of a unibody construction in which a vehicle frame is unitary with the vehicle body 22, as shown in the example in the Figures. As another example, the vehicle body 22 and vehicle frame may have a body-on-frame construction (also referred to as a cab-on-frame construction) in which the vehicle body 22 and vehicle frame are separate components, i.e., are modular, and the vehicle body 22 is supported on and affixed to the vehicle frame. Alternatively, the vehicle frame and vehicle body 22 may have any suitable construction. The vehicle frame and vehicle body 22 may be of any suitable material, for example, steel, aluminum, and/or fiber-reinforced plastic, etc. The vehicle body 22 may include body panels partially defining an exterior of the vehicle 20. The body panels may present a class-A surface, e.g., a finished surface exposed to view by a customer and free of unaesthetic blemishes and defects.

The wheel 40 of the vehicle 20 may transmit rotational force from a vehicle powertrain to a road surface to propel the vehicle 20 relative to the road surface. The wheel 40 may be of any suitable type including, for example, those currently known. The wheel 40 may include a rim and a tire. The wheel 40 may be supported in the wheel well 24, e.g., via a suspension system, control arm, etc.

The linear actuator 26 is actuatable to vary a linear distance defined by the linear actuator 26. The linear distance may be, for example, a distance between opposing distal ends of the linear actuator 26. The linear actuator 26 at the stowed position defines a first length L1 and at the deployed position defines a second length L2. The second length L2 may be longer than the first length L1. In other words, actuating the linear actuator 26 to move from the stowed position to the deployed position may increase the length of the linear actuator 26. The linear actuator 26 may include a first telescoping member 46 and a second telescoping member 48. The first telescoping member 46 may be a hollow cylinder surrounding a chamber 50 therein. The first telescoping member 46 may have an open end 52. The second telescoping member 48 may be lineally slidable within the first telescoping member 46. The second telescoping member 48 may be slidable within the chamber 50 and extend out of the open end 52. The linear actuator 26 may include a pyrotechnic material 54 that rapidly increases in volume upon actuation, e.g., in response to receiving an electrical pulse. The pyrotechnic material 54 may be combustible to produce gas. The pyrotechnic material 54 may be formed of a solid mixture of substances that, when ignited, react to produce the gas. For example, the pyrotechnic material 54 may be formed of sodium azide (NaNO3), potassium nitrate (KNO3), and silicon dioxide (SiO2), which react to form nitrogen gas (N2). The pyrotechnic material 54 may be disposed within the first telescoping member 46, e.g., in the chamber 50 and opposite the open end 52. Actuation of the pyrotechnic material 54 may urge the second member 34 away from the pyrotechnic material 54, causing the second member 34 to slide relative to the first member 28 and increase the length of the linear actuator 26. The linear actuator 26 may include any other suitable structure for changing length when actuated, including conventional structures. For example, the linear actuator 26 may include a motor, gears, rack and pinion, etc.

The linear actuator 26 is supported by the vehicle body 22 vehicle-rearward of the wheel well 24, e.g., along the longitudinal axis A1. Upon actuation, the linear actuator 26 may increase in length toward the wheel well 24. The linear actuator 26 may be below the floor 42 of the vehicle body 22, e.g., along the vertical axis A2. The linear actuator 26 may be fixed to the rocker or other portion of the vehicle body 22. The linear actuator 26 may be fixed to the vehicle body 22 via fastener, bracket, or any suitable structure. The linear actuator 26 may include a lock (not shown) configured to maintain the linear actuator 26 at the deployed position. The locks may include latches, ratchet teeth, pins, springs, or any suitable structure, including conventional locks. Structures of the locks, e.g., the latches, may engage the second telescoping member 48 at the deployed position.

The first member 28 positions and guides movement of the second member 34 relative to the vehicle body 22. The first member 28 extends between the first end 30 of the first member 28 and the second end 32 of the first member 28. The first end 30 of the first member 28 and the second end 32 of the first member 28 are opposite each other. For example, the first end 30 of the first member 28 and the second end 32 of the first member 28 may be at opposing distal ends of the first member 28. The first member 28 may be elongated between the first end 30 of the first member 28 and the second end 32 of the first member 28. In other words, a length from the first end 30 of the first member 28 to the second end 32 of the first member 28 may be longer than a width or a height of the first member 28, where the length, width, and height are perpendicular to each other. The first member 28 may be below the floor 42 along the vertical axis A2. The first member 28 may be metal, or any other suitable material.

The first end 30 of the first member 28 is pivotally connected to the vehicle body 22. The first member 28 may be pivotally connected to the vehicle body 22 with a pivot assembly 56, hinge pin, bushing, bearing, or any other suitable structure that permits angular movement of the first member 28 relative to the vehicle body 22 and inhibits translational movement of the first member 28 relative to the vehicle body 22. For example, the first member 28 may be rotatable relative to the vehicle body 22 about an axis that extends parallel to the vertical axis A2 and through the first end 30 of the first member 28.

The second member 34 is included in the vehicle 20 to control kinematics of the wheel 40 during certain vehicle impacts. The second member 34 extends between the first end 36 of the second member 34 and the second end 38 of the second member 34. The first end 36 of the second member 34 and the second end 38 of the second member 34 are opposite each other. For example, the first end 36 of the second member 34 and the second end 38 of the second member 34 may be at opposing distal ends of the second member 34. The second member 34 may be elongated between the first end 36 of the second member 34 and the second end 38 of the second member 34. In other words, a length from the first end 36 of the second member 34 to the second end 38 of the second member 34 may be longer than a width or a height of the second member 34, where the length, width, and height are perpendicular to each other. The second member 34 may be below the floor 42 along the vertical axis A2. The second member 34 may be below the first member 28 along the vertical axis A2. The second member 34 may be metal, or any other suitable material.

The first end 36 of the second member 34 is pivotally connected to the second end 32 of the first member 28. The first member 28 and the second member 34 may be pivotally connected with a pivot assembly 58, hinge pin, bushing, bearing, or any other suitable structure that permits angular movement of the first member 28 relative to the second member 34 and inhibits translational movement of the first member 28 relative to the second member 34. For example, the first member 28 may be rotatable relative to the vehicle body 22 about an axis that extends parallel to the vertical axis A2 and through the first end 30 of the first member 28.

The second end 38 of the second member 34 is connected to the linear actuator 26. For example, the second member 34 may be connected to the linear actuator 26 via a bulkhead 60. The bulkhead 60 may be fixed to the linear actuator 26, e.g., to the second telescoping member 48 with a weld, fastener, or other suitable structure. Actuation of the linear actuator 26 may move bulkhead 60 linearly relative to the vehicle 20, e.g., along the longitudinal axis A1 and forward toward the wheel well 24. The vehicle 20 may include a track, slot, channel, rail, or other suitable structure to guide movement of the bulkhead 60. The track may be fixed to, and/or a component of, the vehicle body 22. The second end 38 of the second member 34 may be pivotally connected to the bulkhead 60, e.g., with a pivot assembly 62, hinge pin, bushing, bearing, or any other suitable structure that permits angular movement of the second member 34 relative to the bulkhead 60 and inhibits translational movement of the second member 34 relative to the bulkhead 60. For example, the second member 34 may be rotatable relative to the vehicle body 22 about an axis that extends parallel to the vertical axis A2 and through the second end 38 of the second member 34. The second member 34 may be connected to linear actuator 26 with any other suitable structure that transmits force and movement of the linear actuator 26 to the second end 38 of the second member 34 and permits rotation of the second member 34 relative to the linear actuator 26.

The first member 28, the second member 34 and the bulkhead 60 are movable from with the linear actuator 26 from the stowed position toward the wheel well 24 to the deployed position. In other words, actuation of the linear actuator 26 from the stowed position to the deployed position moves the first member 28, the second member 34 and the bulkhead 60 therewith. For example, actuation of the pyrotechnic material 54 may move the second telescoping member 48 rearward toward the wheel 40 and the wheel well 24. Movement of the second telescoping member 48 moves the bulkhead 60 and the second end 38 of the second member 34 connected thereto to the deployed position. Movement of the second member 34 moves the first member 28 connected thereto to the deployed position.

The bulkhead 60 at the stowed position is vehicle-rearward of the bulkhead 60 at the deployed position. In other words, the bulkhead 60 moves forward from the stowed position to the deployed position. The bulkhead 60 at the deployed position is spaced from the wheel 40, e.g., along the longitudinal axis A1. The second member 34 may be between the bulkhead 60 and the wheel 40.

The second end 32 of the first member 28 at the stowed position may be vehicle-rearward of the first end 30 of the first member 28 at the stowed position. For example, the first member 28 at the stored position may extend from the first end 30 of the first member 28 vehicle-rearward and inboard to the second end 32 of the first member 28. The second end 32 of the first member 28 at the deployed position is forward of the first end 30 of the first member 28 at the deployed position. For example, the first member 28 at the deployed position may extend from the first end 30 of the first member 28 forward and inboard to the second end 32 of the first member 28.

The second member 34 at the stowed position is spaced from the wheel 40, e.g., such that the wheel 40 may generally move free of interference from the second member 34. The first end 36 of the second member 34 at the stowed position is vehicle-rearward of the wheel 40, e.g., between the wheel 40 and the linear actuator 26.

The first end 36 of the second member 34 is vehicle 20—forward and inboard of the second end 38 of the second member 34 at the deployed position. In other words, the second member 34 extends from the first end 36 of the second member 34 rearward and outboard to the second end 38 of the second member 34. The first end 36 of the second member 34 at the deployed position is aligned with the wheel 40 along the longitudinal axis A1. For example, the first end 36 of the second member 34 may be between a forward-most surface of the wheel 40 and a rearward-most surface of the wheel 40 along the longitudinal axis A1. The second member 34 at the deployed position abuts the wheel 40. Normal forces between the wheel 40 and the second member 34 at the deployed position may urge the wheel 40 outboard.

The vehicle 20 may include one or more locks 64 configured to maintain the bulkhead 60 at the deployed position. The locks 64 may be supported by the vehicle body 22. For example, the locks 64 may be fixed to the vehicle body 22 between the linear actuator 26 and the wheel well 24. The locks 64 may include latches, ratchet teeth, pins, springs, or any suitable structure, including conventional locks 64. Structures of the locks 64, e.g., the latches, may engage the bulkhead 60 at the deployed position. The latches may be movable between an extended position and a retracted position. A spring may urge the latches to the extended positions. Normal forces between the bulkhead 60 and sloped surfaces of the latches may urge the latches to the retracted positions as the bulkhead 60 moves to the deployed position. The locks 64 may be return to the extend positions when the bulkhead 60 is at the deployed position, the locks 64 blocking movement of the bulkhead 60 rearward from the deployed position.

Figure 5:
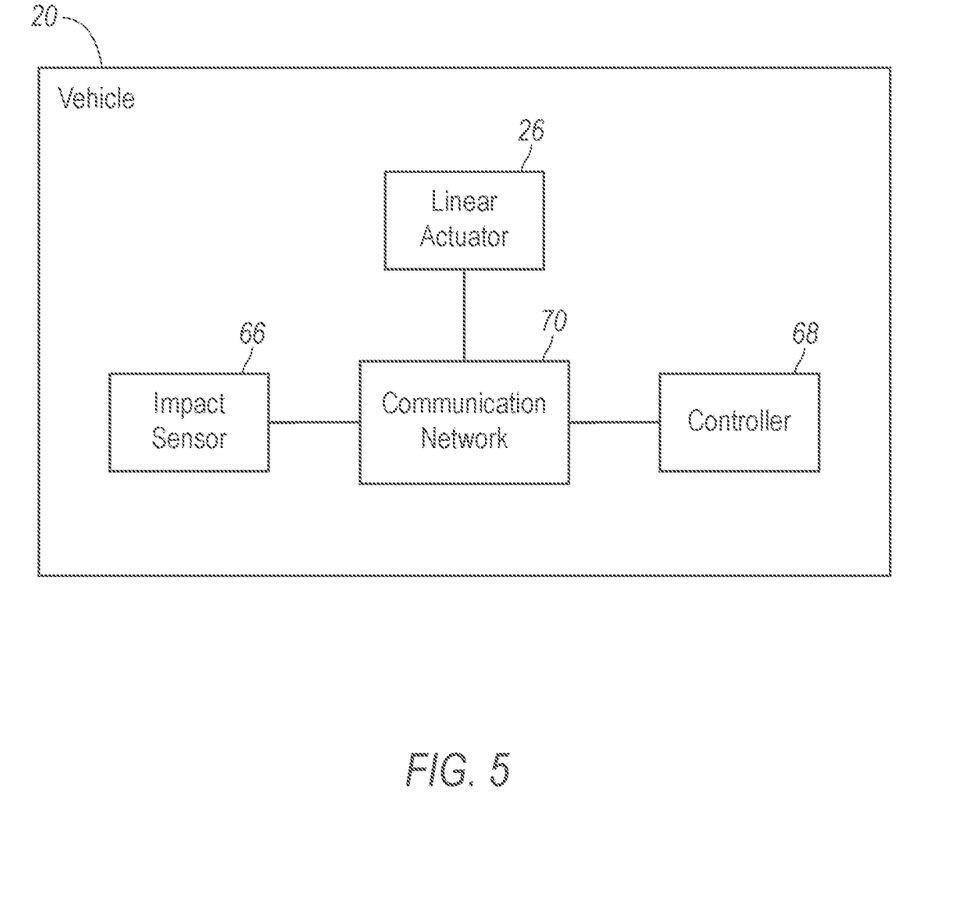
FIG. 5 is a block diagram of components of the vehicle.

With reference to FIG. 5, the vehicle 20 can include one or more impact sensors 66 that are configured to detect certain vehicle impacts. In other words, a "certain vehicle impact" is an impact of the type and/or magnitude for which actuation of the linear actuator 26 from the stowed position toward the wheel well 24 to the deployed position is designed, i.e., "certain" indicates the type and/or magnitude of the impact. The type and/or magnitude of such "certain vehicle impacts" may be pre-stored in a controller 68, e.g., a restraints control module and/or a body control module. The impact sensor may be of any suitable type, for example, post contact sensors such as accelerometers, pressure sensors, and contact switches; and pre impact sensors such as radar, LIDAR, and vision sensing systems. The vision sensing systems may include one or more cameras, CCD image sensors, CMOS image sensors, etc. The impact sensors 66 may be located at numerous points in or on the vehicle 20.

The vehicle 20 may include a control system including at least one impact sensor 66 for sensing certain impacts of the vehicle 20, and the controller 68 in communication with the impact sensor 66 and the linear actuator 26, e.g., via communication network 70 of the vehicle 20. The controller 68 may be a microprocessor-based computer implemented via circuits, chips, or other electronic components. For example, the controller 68 may include a processor, a memory, etc. The memory of the controller 68 may include memory for storing programming instructions executable by the processor as well as for electronically storing data and/or databases. The controller 68 may be, e.g., a restraints control module. The communication network 70 includes hardware, such as a communication bus, for facilitating communication among vehicle components. The communication network 70 may facilitate wired or wireless communication among the vehicle components in accordance with a number of communication protocols such as controller area network (CAN), Ethernet, WiFi, Local Interconnect Network (LIN), and/or other wired or wireless mechanisms.

The controller 68 is configured to activate the linear actuator 26, for example, by providing an impulse to the pyrotechnic material 54 of the linear actuator 26 when the impact sensor senses a certain impact of the vehicle 20. Upon actuation, gas produced by the pyrotechnic material 54 may urge the second telescoping member 48 forward from the first telescoping member 46 and apply force to the bulkhead 60. The force on the bulkhead 60 may move the first member 28 and the second member 34 to the deployed positions. The lock may engage the bulkhead 60 and maintain the first member 28 and the second member 34 in the deployed position. The normal force between the wheel 40 and the second member 34 in the deployed position may urge the wheel 40 outboard out of the wheel well 24.

The adjectives "first" and "second" are used throughout this document as identifiers and do not signify importance, order, or quantity.

The disclosure has been described in an illustrative manner, and it is to be understood that the terminology which has been used is intended to be in the nature of words of description rather than of limitation. The numerical adjectives "first" and "second" are used herein as identifiers and do not indicate order or importance. Many modifications and variations of the present disclosure are possible in light of the above teachings, and the disclosure may be practiced otherwise than as specifically described.

What is claimed is:

1. A vehicle, comprising:
   a vehicle body having a wheel well;
   a linear actuator supported by the vehicle body vehicle-rearward of the wheel well;
   a first member extending between a first end and a second end, the first end pivotally connected to the vehicle body; and
   a second member extending between a first end and a second end, the first end of the second member pivotally connected to the second end of the first member, the second end of the second member connected to the linear actuator;
   the linear actuator, the first member, and the second member movable from a stowed position toward the wheel well to a deployed position.

2. The vehicle of claim 1, wherein the vehicle body includes a rocker, and wherein the linear actuator is fixed to the rocker.

3. The vehicle of claim 1, wherein the first end of the second member is vehicle-forward and vehicle-inboard of the second end of the second member at the deployed position.

4. The vehicle of claim 3, further comprising a wheel supported in the wheel well, and wherein the first end of the second member at the stowed position is vehicle-rearward of the wheel and the first end of the second member at the deployed position is aligned with the wheel along a vehicle-longitudinal axis.

5. The vehicle of claim 3, further comprising a wheel supported in the wheel well, and wherein the second member at the stowed position is spaced from the wheel and the second member at the deployed position abuts the wheel.

6. The vehicle of claim 1, wherein the second end of the first member at the stowed position is vehicle-rearward of the first end of the first member at the stowed position, and the second end of the first member at the deployed position is vehicle-forward of the first end of the first member at the deployed position.

7. The vehicle of claim 1, further comprising a bulkhead movable with the linear actuator from the stowed position to the deployed position, the second end of the second member pivotally connected to the bulkhead.

8. The vehicle of claim 7, further comprising a lock supported by the vehicle body, the lock configured to maintain the bulkhead at the deployed position.

9. The vehicle of claim 7, wherein the bulkhead at the stowed position is vehicle-rearward of the bulkhead at the deployed position.

10. The vehicle of claim 9, further comprising a wheel supported in the wheel well, and wherein the bulkhead at the deployed position is spaced from the wheel.

11. The vehicle of claim 1, wherein the linear actuator includes a pyrotechnic material.

12. The vehicle of claim 1, wherein the vehicle body includes a floor, and wherein the linear actuator and the second member are below the floor.

13. The vehicle of claim 1, wherein the first member is elongated between the first end of the first member and the second end of the first member.

14. The vehicle of claim 13, wherein the second member is elongated between the first end of the second member and the second end of the second member.

15. The vehicle of claim 1, wherein the linear actuator includes a first telescoping member and a second telescoping member linearly slidable within the first telescoping member.

16. The vehicle of claim 15, wherein the linear actuator includes a pyrotechnic material disposed within the first telescoping member.

17. The vehicle of claim 1, wherein the linear actuator at the stowed position defines a first length and the linear actuator at the deployed position defines a second length that is longer than the first length.

* * * * *